UNITED STATES PATENT OFFICE.

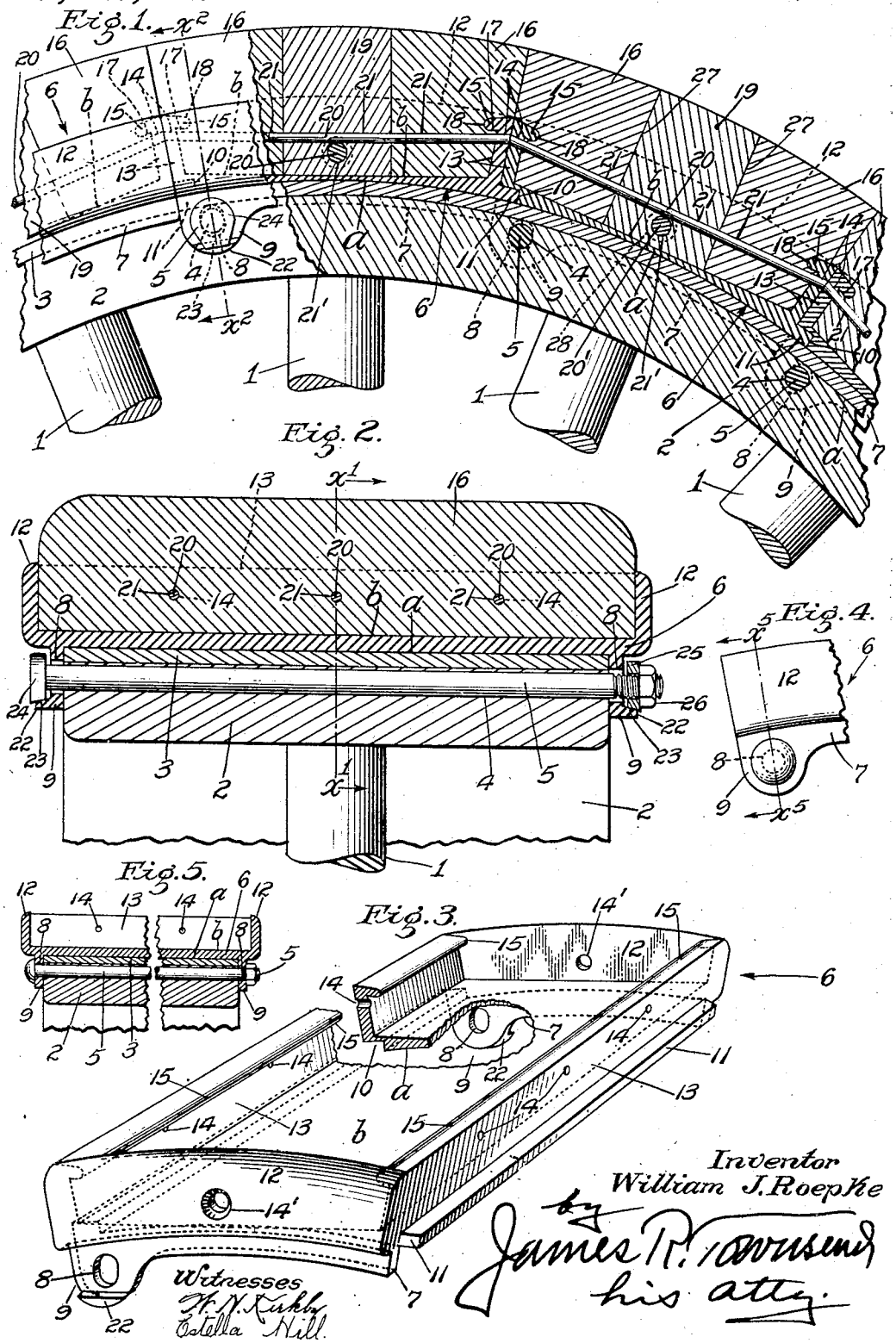

WILLIAM J. ROEPKE, OF LOS ANGELES, CALIFORNIA, ASSIGNOR TO CHARLES B. McCOY, OF LOS ANGELES, CALIFORNIA.

KEY-BLOCK DEMOUNTABLE TRUCK-TIRE.

1,246,324.  Specification of Letters Patent.  Patented Nov. 13, 1917.

Application filed March 8, 1915. Serial No. 12,980.

*To all whom it may concern:*

Be it known that I, WILLIAM J. ROEPKE, a citizen of the United States, residing at Los Angeles, in the county of Los Angeles and State of California, have invented a new and useful Key-Block Demountable Truck-Tire, of which the following is a specification.

This invention relates to that class of devices set forth in my application Serial No. 737122, filed Dec. 6, 1912, for wheel structure. In that application I have shown a wheel for automobiles, trucks and the like comprising a rim with a tread formed of sets of three wooden block members, two of which members are grooved to receive flanges, and the third, an intermediate key-block member, being seated between said outer block members and holding the outer members engaged with the flanged rim; there being means securing the block members of each set together.

It is found that in practical use the strain upon the wooden tread of the tire is so great that very firm solid wood must be used for such tread in order to withstand the strain; and I have discovered that a variety of eucalyptus wood is specially adapted for constructing the tread, but that it is very difficult to so treat such wood as to prevent it from warping; and that when treated so that it will not warp, such wood is practically unworkable on account of its extreme hardness.

An object of this invention is to provide a wooden tire construction in which the wooden tread blocks will be held in proper form irrespective of any tendency of the wood to warp, so that sets of three blocks each may be made up and kept in stock ready for constructing and repairing the tires as required.

Other objects are simplicity of construction, ease of application of the wooden tread to a standard truck wheel, ease of demounting and re-installing the tire and ease of removing and replacing individual sections of the tire.

A difficulty arising in practical use of wooden tread tires for the drivers of motor trucks is the liability of slippage of the wheel within the tire.

Objects of the invention are to so construct a tire for the traction wheels of motor vehicles that there will be no possible slippage between the tire and the rim of the wheel; to minimize the number of bolts required to fasten a determined number of tread blocks to the wheel, and, to limit the number of sections required for each wheel to the number of holes provided in the standard wheel constructed in accordance with the regulations of the Society of Automobile Engineers; to fasten the wooden blocks at a considerable distance from their inner ends so as to increase the resistance to loosening strains; to so construct the sections of the tire that the skidding strain upon the wheel will act directly and mainly upon the rim of the wheel rather than upon the bolts that hold the sections in place on the wheel; and to construct a sectional tire the sections of which can be removed with minimum loosening of bolts or other fastening means and without having to disturb any portion of the tire excepting the section affected, and an adjoining section.

By the present invention I provide a tread section comprising a steel shoe or frame adapted to be fastened by a single bolt to the rim of the wheel, each shoe being also adapted to engage an adjoining shoe by overlapping or underlapping the same, and in the common form I provide fifteen shoes for each wheel thus adapting the same to be applied to the rim of the standard frame that is now provided with fifteen holes to receive fastening bolts. The front or rear side of each shoe has a seat for a bolt and also a recess to receive a flange or lip of an adjoining shoe; each shoe having such a lip located at the side opposite that fastened by the bolt and adapted to engage in the recess of another shoe on the side opposite the fastening, so that there are but fifteen bolts required for fastening the fifteen shoes to the rim and yet each shoe is practically fastened by two bolts, one at each side.

A further object is to do away with all side rings, wedge rings and clencher rims which are ordinarily used to fasten demountable truck tires to wheels; and to avoid the application of any strain to the threads of the fastening bolts; also to absolutely lock the shoe blocks in their shoes without danger of accidental displacement of the locking means.

Other objects and advantages may appear from the subjoined detail description.

The invention is regarded as pioneer in the foregoing novel features and may be variously constructed, and it will be illustrated herein in the form at present deemed most desirable though it is understood that I do not limit the invention to the construction shown which is intended to represent the best form in which I at present contemplate embodying the invention.

The accompanying drawings illustrate the invention.

Figure 1 is a fragmental view partly in elevation and partly in section on line $x^1$, Fig. 2, of a wheel with tire constructed in accordance with this invention.

Fig. 2 is a transverse section on line $x^2$, Fig. 1.

Fig. 3 is a broken perspective view of one of the shoe frames.

Fig. 4 is a fragmental detail side elevation of the steel shoe showing modified forms of the rim-engaging ear and the hole and the bolt therein.

Fig. 5 is a section on line $x^5$, Fig. 4, showing the shoe with the modified elements in Fig. 4 fastened to the rim of the wheel.

The standard wheel to which this tire is applied may be constructed in the usual manner comprising spokes 1 and a rim formed of fellies 2 and steel felly band 3, said fellies being provided with the usual holes 4 extending transversely therethrough from side to side to receive transverse bolts 5 for fastening the felly band to the rim of the wheel.

The shoe comprises a base plate 6 adapted for application to the periphery of the wheel; the inner face $a$ of said plate being arched to fit the face of the felly band 3, and the outer face $b$ being flat and parallel to the chord of the inner arch $a$. The plate is provided with inward extensions in the form of edge flanges 7 projecting inwardly from the edge of the arched side of the plate body to embrace the wheel rim and to engage the edges of the felly band 3 and the sides of the fellies 2; said flanges or inward extensions having oppositely-arranged holes 8 extending therethrough to receive the transverse bolts 5.

Preferably the flanges are enlarged at the ends to form ears 9 and the holes 8 are preferably elongated to form radial slots in said ears 9 to accommodate the bolts as indicated in Figs. 2 and 3 with a slight play, thus to permit wedging the plates firmly against the periphery of the wheel where this is desirable. The shoe is also provided on the end adjacent the bolt holes 8 and ear 9 with a recess 10, and on its opposite side with a projection which may be formed as a lip 11 complementary to the recess, so that when the circle of blocks is assembled, the shoe end having the bolt and the recess will overlap the projection or lip at the end of an adjacent shoe, thus enabling a single bolt 5 to hold in place the interlocked ends of two shoes.

Each shoe is also provided with outer block-retaining means that may be a frame formed of side walls 12 and connecting or end walls 13, the latter being arranged in substantially radial disposition to the wheel and provided with holes 14 arranged oppositely in pairs, so that a pin may be inserted through opposite holes 14 in the end walls.

Said end walls are also provided with block retaining edges that may be inward projections and that are shown in the form of beads 15 to engage the end tread blocks 16 which as in said former application are provided with retainers 17 and grooves 18 to engage and receive the inward projections 15.

The end blocks when seated in a shoe are spaced apart to receive between them a key-block 19 that may be secured in place by pins 20 extending through holes 21 formed in said blocks 16 and 19 and into holes 14 in the end walls.

In Figs. 1 and 3 provision is shown for fastening the tread blocks in the shoe by two different methods, either or both of which may be employed although it is at present deemed more desirable that the single bolt 20' passing through the hole 21' in the key-block and extending from side to side of the shoe through the holes 14' therein be employed for holding the key-block 19 in place, and it is at present assumed that in the preferred form of construction the pins 20 may be dispensed with. The only purpose of the pins 20 is to hold the key-block in place and their extension through the blocks 16 is simply for the purpose of engaging the frame of the shoe.

The peripheral faces of the blocks 16 and 19 are curved transversely of said blocks and the longitudinal traces of the peripheral and inner faces of said blocks are parallel to each other and at right angles to the pin holes 21 through said blocks, so that when the set of three blocks are in their seat and the pins are driven through the blocks and the end retainers, said blocks can only be removed by first driving out the pins 20 and this cannot be done after the sections are in place on the wheel.

The inward projections 9 may be provided with lugs 22 to be wedged against by the ends of the bolt 5 that may have the oblique wedging faces 23 formed on the head 24 and washer 25 of said bolt; said bolt also having the usual nut 26 to force the washer 25 and head 24 of the bolt toward each other thereby to draw the inner face $a$ of the plate 6 home against the face of the felly band.

In Figs. 4 and 5 it is shown that the holes 8 through the inward projections 9 may be circular and said projections may be devoid of the lugs 22.

The block-contacting faces 27 of the key-block 19 are parallel to each other and normal to the inner ends of the blocks 16 and 19 when in place on the flat surface b of the shoe and when the engaging blocks 16 are adjusted in the shoe ready for assembling therewith the key-block 19, said key-block will spread the outer ends of the engaging blocks apart, thus swinging the inner ends of said blocks toward each other and away from the end walls of the shoe; and thereupon the key-block may be forcibly driven or pressed into place as shown in Fig. 1, thus swinging the inner ends of the end blocks 16 tight against the end walls and into the position shown in Fig. 1.

I have discovered that by thus making the block-contacting sides of the key-block parallel and driving said block home into place as above stated said key-block becomes very tightly fixed in place, and that the use of pins 20 or 20' for holding the key-block in place is only an extra precaution to insure against any accident that might arise from unexpected shrinking of the key-block.

It is found that in driving the key-block home considerable force is required until the block passes in beyond the outer plane of the end walls 13 and that less pressure is required to force the block thence on into its seat; but that to remove the block it is necessary to exert considerable force to bring the inner end of the block out to said plane, and that when such plane is passed, the block is likely to fly out with considerable force depending upon the compression of the blocks effected while fastening them in place.

Where a transverse pin 20' is used the ends thereof may be riveted in place in the walls 12; and for this purpose the holes 14' in the side walls 12 may be countersunk to receive the heads 28 thus formed.

In practice the shoe frame is made of any suitably strong material and may be cast of crucible steel or made of pressed steel. Freshly cut eucalyptus wood is sawed to appropriate sizes and properly shaped, the outer blocks 16, 16 being provided with the grooves 18 and when desired all the blocks are provided with the holes 21 and the blocks 19 with the holes 21' or preferably the holes 21 are omitted. All the blocks are then somewhat dried, care being taken not to dry them sufficiently to cause them to warp. Thereupon the blocks are boiled in crude petroleum or other preserving material and are then removed and inserted into the shoe, the grooved outer blocks being first placed within the shoe and the key-block then being driven home between them, after which the pins 20 or 20' or both, as the case may be, are driven through the holes prepared therefor, thus securing the blocks firmly in the shoe.

The tread sections thus constructed of the shoe and the blocks 16, 16 and 19 fastened therein, are then ready to be kept in stock and to be applied to the wheel rims. Such application is readily effected by applying the arched plates to the wheel rim, one after the other, inserting the lip of one shoe into the recess of its adjoining shoe and inserting the bolts 5 through the ears and wheel rim as the work progresses. At the close of the operation two of the sections must be simultaneously inserted as one unit in order that the lips may be brought into the recesses and when all the sections are in place and the bolts inserted and nuts applied thereto the wheel is ready for use.

In placing the last two blocks in place they will first be assembled with each other and then the lip projecting from one end of the brace of blocks will be inserted into the recess of the block in place to receive it and then the brace of blocks will be swung into place with the terminal recess thereof embracing the exposed lip.

I claim:—

1. A plate having one side adapted for application to the periphery of a wheel, and provided with inward projections to embrace between them the rim of a wheel, there being holes extending through said projections at the corresponding opposite ends thereof to receive a bolt, said projections having wedging faces toward the holes, and a bolt provided with means adapted to wedge against the wedging faces of said projections to draw the plate against the rim of the wheel.

2. A tire section comprising a base plate adapted to fit the rim of a wheel; outwardly projecting flat side walls and end walls forming a frame upon said base plate; said end walls being substantially in radial disposition to the wheel and having inwardly projecting retaining edges thereon; blocks having end faces, which conform to and engage the retaining edges on said end walls; the adjacent faces of said blocks being parallel; an intermediate block in the frame between said first-named blocks, said intermediate block having parallel faces in engagement with the parallel faces of the first-named blocks and means for securing the intermediate block to the frame.

3. A tire section comprising a base plate adapted for attachment to the rim of a wheel; outwardly projecting flat side walls and end walls forming a frame upon said base plate; said end walls being substantially in radial disposition to the wheel and having inwardly projecting retaining edges thereon; blocks being spaced apart and engaging said retaining edges and said end walls; an intermediate block between said blocks and having parallel faces in engagement with the adjacent faces of said blocks to hold said blocks in engagement with the retaining edges and a pin extending through the intermediate block and connecting the same to said frame.

4. A tire section comprising a base plate adapted for attachment to the rim of a wheel; outwardly projecting flat side walls and end walls forming a frame upon said base plate; said end walls being substantially in radial disposition to the wheel and having inwardly projecting retaining edges thereon; blocks being spaced apart and engaging said retaining edges and said end walls; an intermediate block between said blocks and having parallel faces in engagement with the adjacent faces of said blocks to hold said blocks in engagement with the retaining edges and a transverse pin extending through the intermediate block and connecting the same to said frame.

5. A tire section comprising a base plate adapted for attachment to the rim of a wheel; outwardly projecting flat side walls and end walls forming a frame upon said base plate; said end walls being substantially in radial disposition to the wheel and having inwardly projecting retaining edges thereon; blocks being spaced apart and engaging said retaining edges and said end walls; an intermediate block between said blocks and having parallel faces in engagement with the adjacent faces of said blocks to hold said blocks in engagement with the retaining edges, and a transverse pin extending through the intermediate block and connecting the same to said frame, the ends of said pin being riveted in the sides of said frame.

6. A tire section comprising a base plate adapted for attachment to the rim of a wheel; outwardly projecting flat side walls and end walls forming a frame upon said base plate; said end walls being substantially in radial disposition to the wheel and having inwardly projecting retaining edges thereon; blocks being spaced apart and engaging said retaining edges and said end walls; an intermediate block between said blocks and having parallel faces in engagement with the adjacent faces of said blocks to hold said blocks in engagement with the retaining edges and a transverse pin extending through the intermediate block and connecting the same to said frame, and pins extending through said blocks and the intermediate block and through the ends of the frame.

In testimony whereof, I have hereunto set my hand at Los Angeles, California, this 3rd day of March, 1915.

WILLIAM J. ROEPKE.

In presence of—
   James R. Townsend,
   Estella Hill.

Copies of this patent may be obtained for five cents each, by addressing the "Commissioner of Patents, Washington, D. C."